United States Patent
Taggart

[11] Patent Number: 5,398,958
[45] Date of Patent: Mar. 21, 1995

[54] TETHERED ATTACHMENT FOR AN AIR BAG

[75] Inventor: Ken B. Taggart, St. Clair Shores, Mich.

[73] Assignee: TRW Vehicle Safety Systems Inc., Lyndhurst, Ohio

[21] Appl. No.: 228,591

[22] Filed: Apr. 15, 1994

[51] Int. Cl.⁶ ............................................... B60R 21/20
[52] U.S. Cl. ............................ 280/728 A; 280/743 R
[58] Field of Search .......... 280/728 A, 743 R, 743 A, 280/732, 731, 730 R, 728 R

[56] References Cited

U.S. PATENT DOCUMENTS

| | | | |
|---|---|---|---|
| 4,944,527 | 7/1990 | Bishop et al. | 280/728 A |
| 4,964,654 | 10/1990 | Bishop et al. | 280/728 A |
| 5,022,675 | 6/1991 | Zelenak, Jr. et al. | 280/743 R |
| 5,074,584 | 12/1991 | Jarboe | 280/728 A |
| 5,149,130 | 9/1992 | Wooley et al. | 280/743 R |

FOREIGN PATENT DOCUMENTS 4356247 12/1992 Japan ............................ 280/728 A
5294203 11/1993 Japan ............................ 280/728 A

*Primary Examiner*—Margaret A. Focarino
*Assistant Examiner*—Peter C. English
*Attorney, Agent, or Firm*—Tarolli, Sundheim & Covell

[57] ABSTRACT

A vehicle safety apparatus (10) includes an inflatable vehicle occupant restraint (80) for, when inflated, restraining an occupant of a vehicle. A housing (12) has a chamber (32) for receiving the inflatable restraint (80) when the inflatable restraint is in an uninflated condition. The housing (12) has a plurality of openings (40, 42, 44, 50, 52, 54) extending between the interior and the exterior of the housing. A plurality of tethers (110, 112, 114, 120, 122, 124) are connected with the inflatable restraint (80). The tethers extend from the inflatable restraint (80) through the openings in the housing (12) from the interior to the exterior of the housing. The tethers (110, 112, 114, 120, 122, 124) are connected to the exterior of the housing (12) to secure the tethers to the housing and thereby to secure the inflatable restraint (80) to the housing.

14 Claims, 3 Drawing Sheets

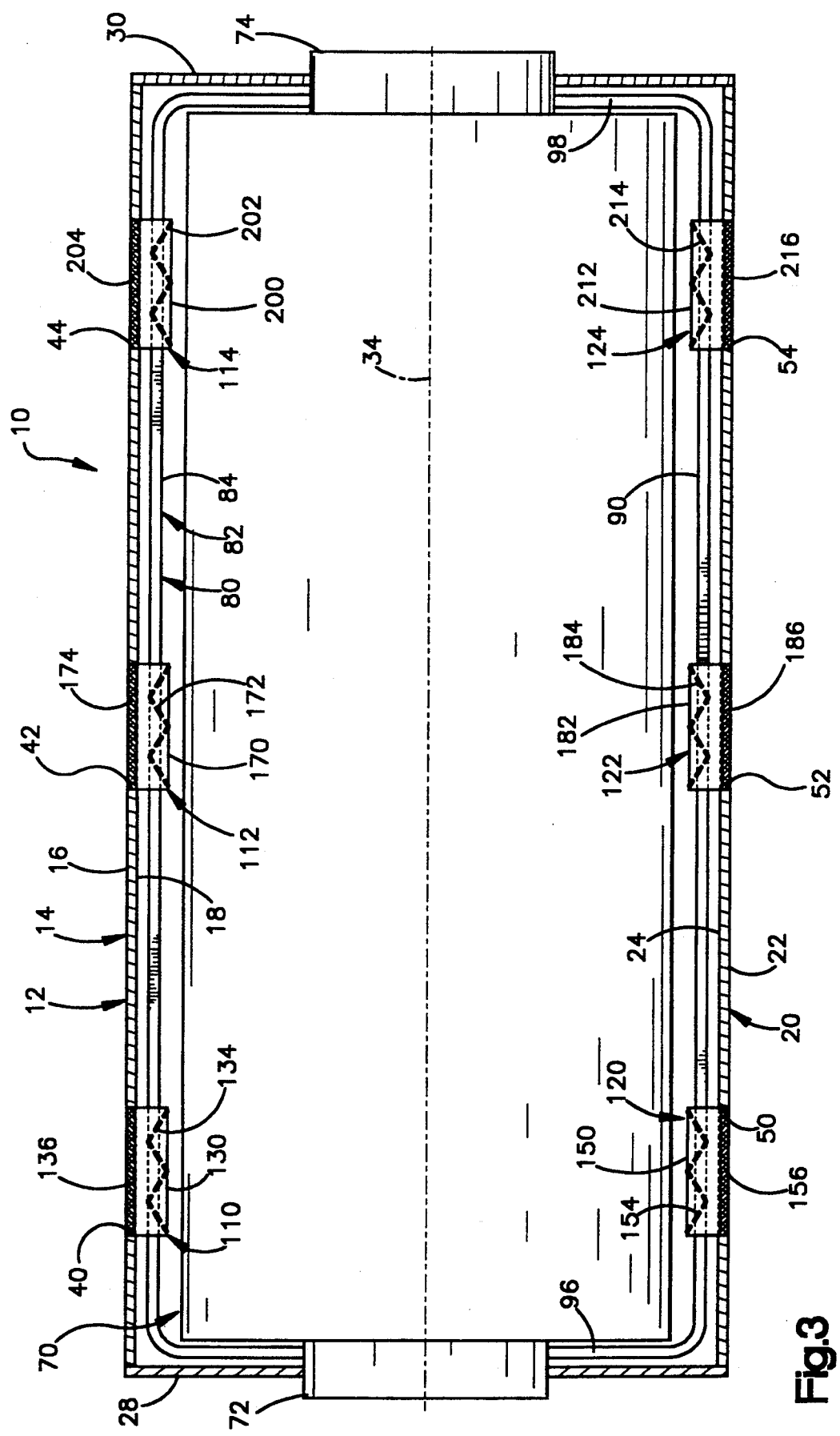

TETHERED ATTACHMENT FOR AN AIR BAG

BACKGROUND OF THE INVENTION

1. Technical Field

The present invention relates to a vehicle safety apparatus for protecting an occupant of a vehicle. In particular, the present invention relates to a vehicle safety apparatus including an inflatable occupant restraint such as an air bag secured to a housing.

2. Description of the Prior Art

An inflatable vehicle occupant restraint such as an air bag is used to restrain a vehicle occupant in the event of sudden deceleration such as occurs in a vehicle collision. An air bag is typically folded and stored in a housing secured to a portion of the vehicle such as the instrument panel. In the event of sudden deceleration, an inflator is actuated to supply inflation fluid under pressure to the air bag. The air bag inflates to restrain the vehicle occupant.

A portion of the air bag is connected with the housing to retain the air bag in position in the vehicle. It is known to connect an air bag with a housing by a retaining ring secured to the air bag. It is also known to connect portions of the material of an air bag directly to a housing.

SUMMARY OF THE INVENTION

The present invention is an apparatus comprising an inflatable vehicle occupant restraint such as an air bag for, when inflated, restraining an occupant of a vehicle. The inflatable restraint has an uninflated condition and an inflated condition. The apparatus includes a housing having a chamber for receiving the inflatable restraint when the inflatable restraint is in the uninflated condition.

The housing has a plurality of openings extending between the interior and the exterior of the housing. A plurality of tethers are connected with the inflatable restraint. The tethers extend from the inflatable restraint through the openings in the housing from the interior to the exterior of the housing. The tethers are connected to the exterior of the housing to secure the tethers and thereby to secure the inflatable restraint to the housing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a view of the apparatus of FIG. 1 taken partly in section along line 3—3 of FIG. 1.

DESCRIPTION OF A PREFERRED EMBODIMENT

Figure 1:
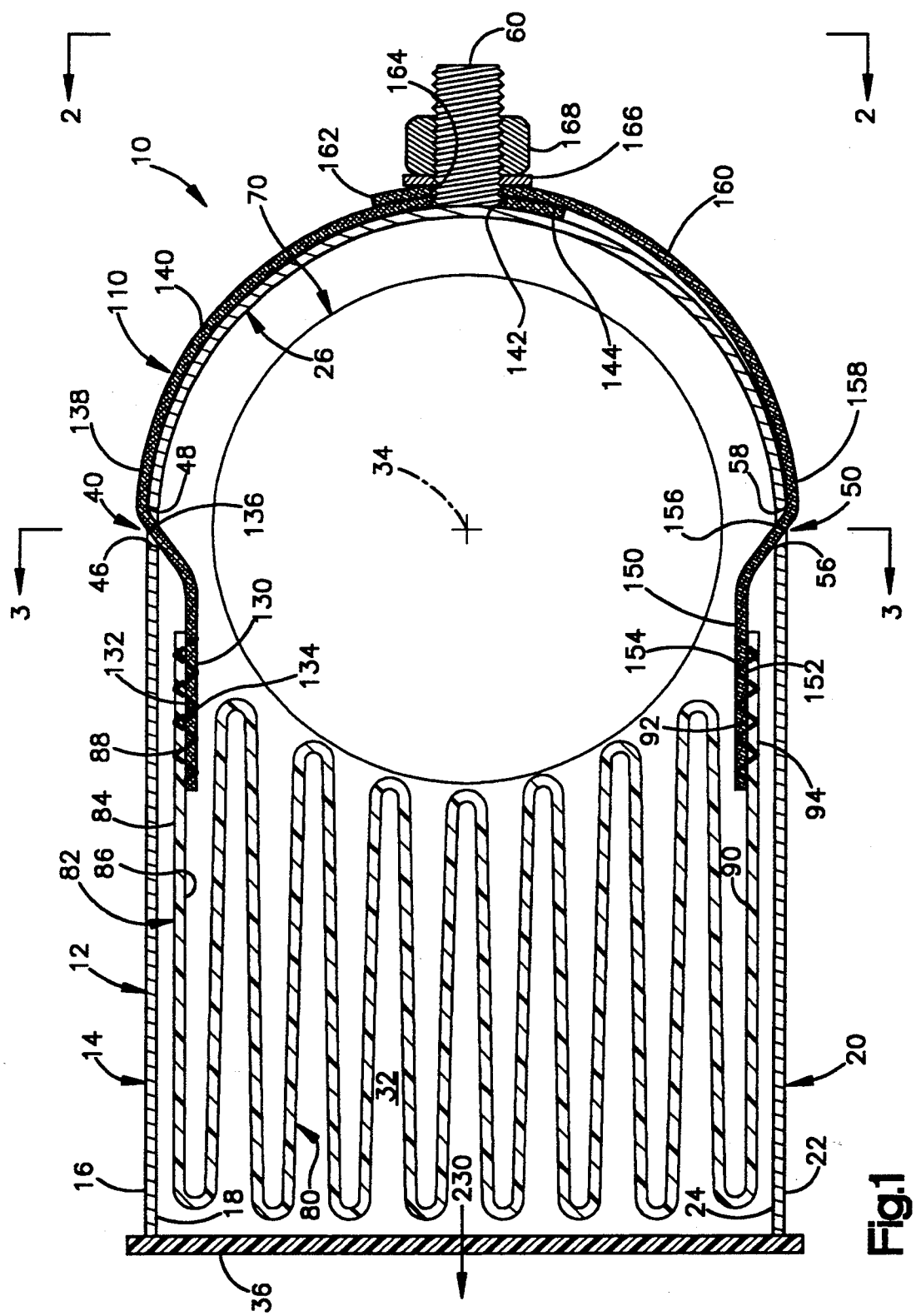
FIG. 1 is a schematic sectional view of a vehicle safety apparatus embodying the present invention.

The present invention relates to a vehicle safety apparatus for protecting an occupant of a vehicle in the event of a vehicle collision. The present invention is applicable to various vehicle safety apparatus constructions. As representative of the present invention, FIG. 1 illustrates a vehicle safety apparatus 10.

The vehicle safety apparatus 10 includes a reaction canister or housing 12. The housing 12 is made of sheet metal about 1 mm thick and includes a generally planar upper wall 14 having an outer side surface 16 and an inner side surface 18. The housing 12 also includes a generally planar lower wall 20 spaced from and extending parallel to the upper wall 14. The housing lower wall 20 has an outer side surface 22 and an inner side surface 24. The inner side surface 24 of the lower wall 20 is presented toward the inner side surface 18 of the upper wall 14. The housing 12 further includes a curved central wall 26 extending between and interconnecting the upper wall 14 and the lower wall 20 to form the C-shaped cross-sectional configuration shown in FIG. 1.

Opposed parallel end walls 28 and 30 (FIG. 2) of the housing 12 extend perpendicular to the upper and lower walls 14 and 20 at opposite ends of the C-shaped configuration. The edges of the housing walls 14, 20, 28, and 30 define an opening into the housing 12 opposite the central wall 26. The housing walls 14, 20, 26, 28, and 30 also define a chamber 32 (FIG. 1) in the housing 12. An axis 34 of the apparatus 10 extends longitudinally between the end walls 28 and 30 of the housing 12. The axis 34 is disposed parallel to and equidistant between the upper and lower walls 14 and 20.

The vehicle safety apparatus 10 also includes a cover 36 which closes the opening into the housing 12. The cover 36 is preferably made of plastic and may form a portion of the vehicle instrument panel. The vehicle safety apparatus 10 may include flanges on the housing 12 or other structure (not shown) for securing the vehicle safety apparatus to the vehicle.

Three identical openings 40, 42, and 44 (FIGS. 2 and 3) extend through the housing upper wall 14 between the inner side surface 18 and the outer side surface 16. The openings 40, 42 and 44 are elongate slots which extend between the interior and the exterior of the housing 12. The slots 40, 42, and 44 are collinear and extend parallel to the axis 34 in a direction from one end wall 28 of the housing toward the other end wall 30. Each slot is defined by surfaces of the housing upper wall 14. For example, the housing upper wall 14 includes two surfaces 46 and 48 (FIG. 1) which define the long sides of the slot 40.

Three identical slots 50, 52, and 54 (FIGS. 2 and 3) extend through the lower wall 20 between the inner and outer surfaces 24 and 22. The openings 50, 52 and 54 are elongate slots which are identical in configuration to each other and to the upper wall slots 40, 42 and 44. The slots 50, 52, and 54 extend between the interior and the exterior of the housing 12. The slots 50, 52, and 54 are collinear and extend parallel to the axis 34 in a direction from one end wall 28 of the housing 12 toward the other end wall 30. The slot 50 (FIG. 1) is partially defined by two surfaces 56 and 58 of the housing lower wall 20.

The lower wall slots 50, 52, and 54 are aligned with the upper wall slots 40, 42, and 44. That is, the first lower wall slot 50 (FIG. 2) is the same distance from the housing end wall 28 as the first upper wall slot 40. The second lower wall slot 52 and the second upper wall slot 42 are both disposed equidistant between the housing end walls 28 and 30. The third lower wall slot 54 is disposed at the same distance from the housing end wall 30 as the third upper wall slot 44. The longitudinal center lines of the upper wall slots 40, 42 and 44, the axis 34, and the longitudinal center lines of the lower wall slots 50, 52 and 54 are all coplanar.

Figure 2:
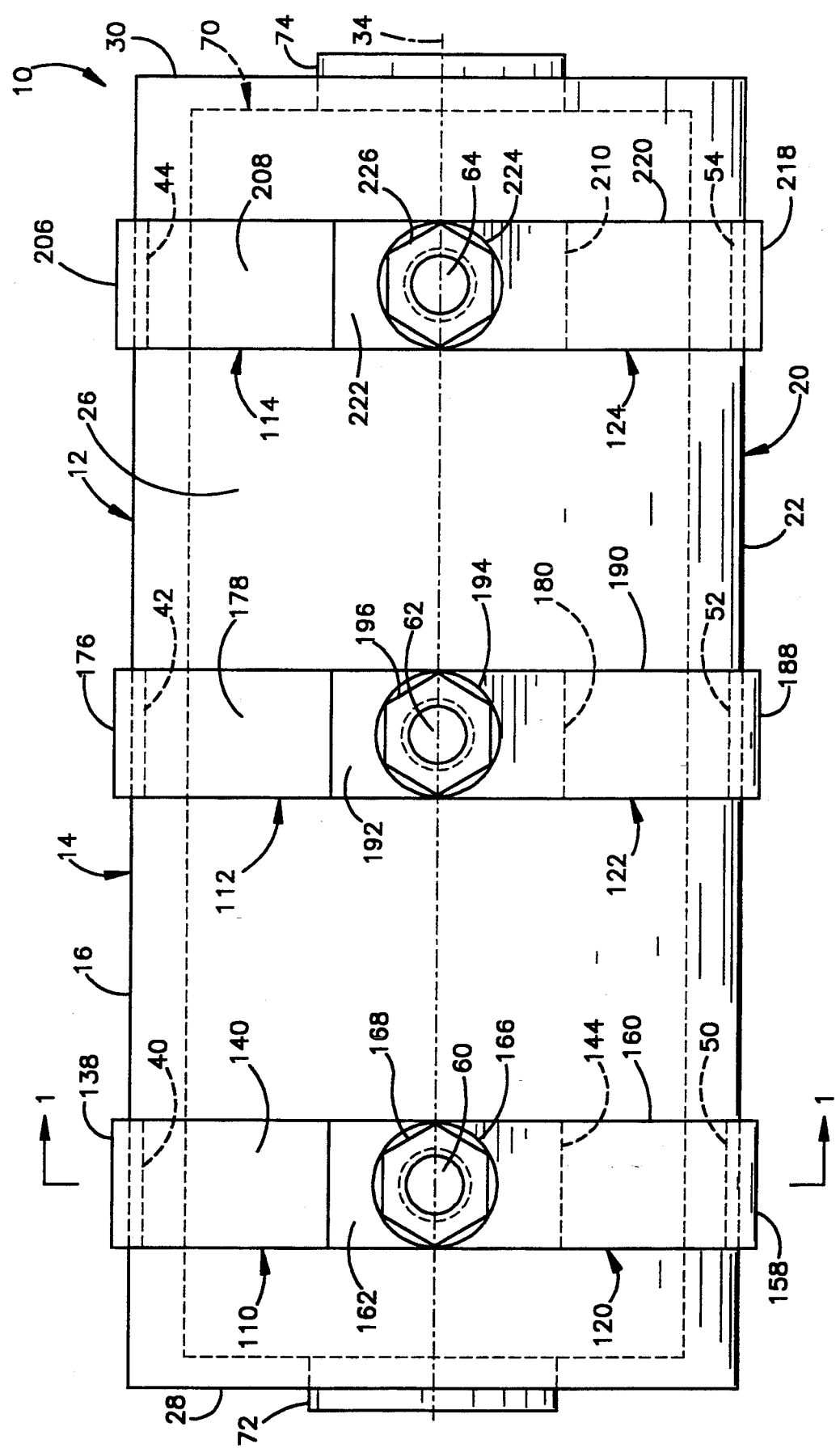
FIG. 2 is an elevational view of the apparatus of FIG. 1 taken along line 2—2 of FIG. 1.

Three externally threaded mounting studs 60, 62, and 64 are disposed on the exterior of the housing 12. The mounting studs 60, 62, and 64 project from the housing central wall 26 in a direction away from the axis 34. The mounting studs 60, 62, and 64 are aligned with the upper and lower wall slots 40, 42, 44, and 50, 52, 54, in a direction along the axis 34. Thus, as can be seen in FIG. 2, the first mounting stud 60 is the same distance from the housing end wall 28 as the first slots 40 and 50. The second mounting stud 62 is disposed equidistant between the housing end walls 28 and 30. The third mounting stud 64 is the same distance from the housing end wall 30 as the third slots 44 and 54.

The vehicle safety apparatus 10 (FIG. 1) includes an inflator indicated schematically at 70. The inflator 70 is disposed in the chamber 32 in the housing 12 adjacent to the central wall portion 26 of the housing 12. The inflator 70 is a known inflator having an elongate cylindrical shape with an axis which is coincident with the axis 34.

One end portion 72 (FIG. 2) of the inflator 70 is secured to or disposed adjacent to the end wall 28 of the housing 12. The opposite end portion 74 of the inflator 70 is secured to or disposed adjacent to the opposite end wall 30 of the housing 12. The inflator 70 has one or more gas outlets (not shown) through which inflation fluid is directed, upon actuation of the inflator, into the chamber 32.

The vehicle safety apparatus 10 (FIG. 1) includes an air bag indicated schematically at 80. The air bag 80 is folded and stored in the chamber 32 in the housing 12. The air bag 80 has a tubular portion 82 which defines an opening for receiving inflation fluid from the inflator 70. The tubular portion 82 is rectangular in cross-sectional configuration, as seen in FIG. 3. The tubular portion 82 can be a separate tubular member sewn to the panels of the air bag 80, or it can constitute portions of the air bag panels themselves.

The tubular portion 82 includes four flaps 84, 90, 96, and 98 which are disposed in close fitting relationship against and inside the walls of the housing 12. A flat upper flap 84 extends along the inner side surface 18 of the housing upper wall 14 and has an inner surface 86. The upper flap 84 also has an end portion 88 disposed adjacent to the upper wall slots 40, 42, and 44. A flat lower flap 90 extends along the inner surface 24 of the housing lower wall 20 and has an inner surface 92. The lower flap 90 also has an end portion 94 disposed adjacent to the lower wall slots 50, 52, and 54. A flat end flap 96 (FIG. 3) is disposed adjacent to and inside the end wall 28 of the housing 12. A flat end flap 98 is disposed adjacent to and inside the opposite end wall 30 of the housing 12.

A plurality of tethers are connected with the air bag 80 and with the housing 12 and secure the air bag to the housing. Specifically, the vehicle safety apparatus includes three upper tethers 110, 112, and 114 (FIGS. 1-3), and three lower tethers 120, 122, and 124. Each tether is a thin, elongate member made from woven nylon fabric in the shape of a strap.

The first upper tether 110 (FIG. 1) connects the upper flap 84 of the air bag 80 with the first mounting stud 60. The first upper tether 110 has an inner end portion 130 disposed inside the chamber 32 in the housing 12. The inner end portion 130 has an outer surface 132 in abutting engagement with the inner surface 86 of the air bag upper flap 84. The tether inner end portion 130 and the upper flap end portion 88 are stitched together as indicated at 134, to secure the first upper tether 110 to the air bag 80.

A portion 136 (FIGS. 1 and 3) of the tether 110 which is contiguous with the end portion 130 extends through the first upper wall slot 40, between the surfaces 46 and 48, from the interior to the exterior of the housing 12. Another portion 138 (FIGS. 1 and 2) of the first upper tether 110 is contiguous with the portion 136 and overlies the outer side surface 16 of the housing upper wall 14. The tether portion 138 extends along the outer side surface 16 from the slot 40 in a direction away from the cover 36.

A fourth portion 140 of the tether 110 is contiguous with the portion 138 and overlies the central wall portion 26 of the housing 12. The tether portion 140 extends from the portion 138 in a direction toward the first mounting stud 60. An outer end portion 144 of the first upper tether 110 is contiguous with the fourth portion 140 and has an opening 142 (FIG. 1) through which the first mounting stud 60 extends.

The first lower tether 120 (FIG. 1) connects the air bag lower flap 90 with the first mounting stud 60. The first lower tether 120 has an inner end portion 150 (FIGS. 1 and 3) disposed inside the chamber 32 in the housing 12. The inner end portion 150 has an outer surface 152 in abutting engagement with the inner surface 92 of the air bag lower flap 90. The inner end portion 150 is stitched to the air bag lower flap end portion 94 by stitching indicated schematically at 154, to secure the first lower tether 120 to the air bag 80.

A portion 156 (FIGS. 1 and 3) of the first lower tether 120 which is contiguous with the end portion 150 extends through the first lower wall slot 50, between the surfaces 56 and 58, from the interior to the exterior of the housing 12. Another portion 158 (FIGS. 1 and 2) of the first lower tether 120 is contiguous with the portion 156 and overlies the outer side surface 22 of the housing lower wall 20. The tether portion 158 extends along the housing surface 22 from the slot 50 in a direction away from the cover 36.

A fourth portion 160 of the first lower tether 120 is contiguous with the portion 158 and overlies the exterior of the housing central wall portion 26. The tether portion 160 extends from the portion 158 along the exterior of the central wall 26 in a direction toward the first mounting stud 60.

An outer end portion 162 of the first lower tether 120 is contiguous with the fourth portion 160 and overlies the outer end portion 144 of the first upper tether 110. The first mounting stud 60 extends through an opening 164 (FIGS. 1) in the tether outer end portion 162. A washer 166 is disposed on the stud 60 over the tether outer end portions 144 and 162, and a nut 168 is threaded on the stud 60. The nut 168 cooperates with the washer 166 to clamp the end portions 144 and 162 of the first tethers 110 and 120 against the central wall 26 of the housing 12, to secure the air bag 80 at least partially to the housing 12.

The second upper tether 112 (FIGS. 2 and 3) is identical in configuration, and in its relationship to the housing 12, to the first upper tether 110. However, the second upper tether 112 extends from the air bag upper flap 84 through the second upper wall slot 42 and to the second mounting stud 62.

Thus, the second upper tether 112 has an inner end portion 170 (FIG. 3) disposed within the chamber 32 in the housing 12. The inner end portion 170 is stitched at 172 to the air bag upper flap 84. A portion 174 of the second upper tether 112 extends through the second upper wall slot 42 from the interior to the exterior of the housing 12.

Another portion 176 (FIGS. 2 and 3) of the second upper tether 112 overlies and extends along the outer surface 16 of the upper wall 14 of the housing 12, in a direction away from the cover 36. Yet another portion 178 (FIG. 2) of the second upper tether 112 overlies and extends along the exterior of the housing central wall portion 26 in a direction toward the second mounting stud 62. The second mounting stud 62 extends through an opening (not shown) in an outer end portion 180 (FIG. 2) of the tether 112.

The second lower tether 122 (FIGS. 2 and 3) is identical in configuration, and in its relationship to the housing 12, to the first lower tether 120. However, the second lower tether 122 extends from the air bag lower flap 90 through the second lower wall slot 52 and to the second mounting stud 62.

Thus, the second lower tether 122 has an inner end portion 182 (FIG. 3) disposed inside the chamber 32 in the housing 12. The strap inner end portion 182 is stitched at 184 to the air bag lower flap 90. A portion 186 of the second lower tether 122 extends through the second lower wall slot 52 from the interior to the exterior of the housing 12.

Another portion 188 (FIG. 2) of the second lower tether 122 overlies and extends along the outer surface 22 of the lower wall 20 of the housing 12 in a direction away from the cover 36. Yet another portion 190 of the second lower tether 122 overlies and extends along the exterior of the housing central wall portion 26, in a direction toward the second mounting stud 62.

The second lower tether 122 has an outer end portion 192 which overlies the outer end portion 180 of the second upper tether 112. The second mounting stud 62 extends through an opening (not shown) in the second lower tether outer end portion 192. A washer 194 and a nut 196 are disposed on the second mounting stud 62. The nut 196 cooperates with the washer 194 to clamp the end portions 180 and 192 of the second tethers 112 and 122 against the housing central wall 26, to secure the air bag 80 at least partially to the housing 12.

The third upper tether 114 (FIGS. 2 and 3) is identical in configuration, and in its relationship to the housing 12, to the first and second upper tethers 110 and 112. However, the third upper tether 114 extends from the air bag upper flap 84 through the third upper wall slot 44 and to the third mounting stud 64.

Thus, the third upper tether 114 has an inner end portion 200 (FIG. 3) disposed inside the chamber 32 in the housing 12. The inner end portion 200 is stitched at 202 to the air bag upper flap 84, to secure the tether 114 to the air bag 80. A portion 204 of the third upper tether 114 extends through the third upper wall slot 44 from the interior to the exterior of the housing 12.

Another portion 206 (FIG. 2) of the third upper tether 114 overlies and extends along the outer surface 16 of the housing upper wall 14, in a direction away from the cover 36. Yet another portion 208 of the third upper tether 114 extends along and overlies the exterior of the central wall portion 26 of the housing 12, in a direction toward the third mounting stud 64. The third mounting stud 64 extends through an opening (not shown) in an outer end portion 210 of the third upper tether 114.

The third lower tether 124 (FIGS. 2 and 3) is identical in configuration, and in its relationship to the housing 12, to the first and second lower tethers 120 and 122. However, the third lower tether 124 extends from the air bag lower flap 90 through the third lower wall slot 54 and to the third mounting stud 64.

Thus, the third lower tether 124 (FIG. 3) has an inner end portion 212 disposed within the chamber 32 in the housing 12. The inner end portion 212 is stitched at 214 to the air bag lower flap 90, to secure the third lower tether 124 to the air bag 80.

A portion 216 of the third lower tether 124 extends through the third lower wall slot 54 from the interior to the exterior of the housing 12. A contiguous portion 218 (FIG. 2) of the third lower tether 124 overlies and extends along the outer surface 22 of the housing lower wall 20, in a direction away from the cover 36. Another portion 220 (FIG. 2) of the third lower tether 124 overlies and extends along the exterior of the housing central wall portion 26 in a direction toward the third mounting stud 64.

An outer end portion 222 of the third lower tether 124 overlies the outer end portion 210 of the third upper tether 114. The third mounting stud 64 extends through an opening (not shown) in the outer end portion 222. A washer 224 and a nut 226 are disposed on the third mounting stud 64. The nut 226 cooperates with the washer 224 to clamp the strap end portions 210 and 222 against the central wall portion 26 of the housing 12, to secure the air bag 80 to the housing 12.

In the event of a vehicle collision, the inflator 70 (FIG. 1) is actuated in a known manner to direct fluid under pressure into the air bag 80. Inflation fluid flows from the inflator 70 into the air bag 80 through the opening defined by the air bag tubular portion 82. As the air bag 80 inflates, it displaces or moves through the cover 36 into a position in the vehicle to restrain a vehicle occupant.

The tethers 110–114 and 120–124, which connect the air bag 80 to the housing 12, are pulled tight upon assembly of the vehicle safety apparatus 10. Thus, the tethers do not extend when the air bag 80 deploys. The force of the moving air bag 80 is transmitted through the tethers 110–114 and 120–124 and the mounting studs 60–64 into the housing 12. The tethers maintain the air bag 80 in the desired position relative to the housing 12 when the air bag is in the inflated condition. Therefore, no retaining ring is needed to secure the air bag 80 to the housing 12.

Suitable dimensions for the tethers 110–114 and 120–124 include a width (along the direction of the axis 34) of one inch (1") and a thickness of about 1 mm. The width of the tethers 110–114 and 120–124 is dependent on the strength of the material from which the tethers are made. The tethers 110–114 and 120–124 may be relatively wide if made of a material such as typical air bag fabric, which can be, for example, 840 denier, 32×32 weave, nylon 6.6 fabric. The tethers 110–114 and 120–124 can be made narrower if made from a stronger material. The slots 40–44 and 50–54 are made just large enough to accommodate the width and thickness of the tethers.

From the above description of the invention, those skilled in the art will perceive improvements, changes and modifications. For example, the tether outer end portions can be attached to the exterior of the housing with hook-and-loop or other type of fasteners. Alternatively, each upper tether could be secured directly to its associated lower tether, thus connecting the tethers to the exterior of the housing by wrapping tightly around the housing. The tether outer end portions could alternatively be attached to the housing at locations adjacent to the slots rather than wrapping around the central wall portion of the housing. Also, any suitable number of tethers can be provided, although three upper tethers and three lower tethers are shown. Such improvements, changes and modifications within the skill of the art are intended to be covered by the appended claims.

Having described the invention, I claim:

1. An apparatus comprising:
   an inflatable vehicle occupant restraint for, when inflated, restraining an occupant of a vehicle, said inflatable restraint having an uninflated condition and an inflated condition;
   a housing having a chamber for receiving said inflatable restraint when said inflatable restraint is in the uninflated condition, said housing having a plurality of openings extending between the interior and the exterior of said housing;
   a plurality of tethers connected with said inflatable restraint, said tethers extending from said inflatable restraint through said openings in said housing from the interior to the exterior of said housing; and
   means for connecting said tethers to the exterior of said housing to secure said tethers to said housing and thereby to secure said inflatable restraint to said housing;
   wherein said means for connecting said tethers to the exterior of said housing comprises a threaded member disposed on the exterior of said housing.

2. An apparatus as set forth in claim 1 including an inflator for, when actuated, inflating said inflatable restraint;
   said housing having a first end portion defining a deployment opening through which said inflatable restraint inflates and a second end portion including an end wall opposite from said deployment opening;
   said inflator being disposed in said chamber in said housing at a location adjacent to said end wall and intermediate said inflatable restraint and said end wall; and
   said means for connecting said tethers to the exterior of said housing comprising means for connecting said tethers to said end wall of said housing, said end wall being disposed intermediate said inflator and said tethers.

3. An apparatus comprising:
   an inflatable vehicle occupant restraint for, when inflated, restraining an occupant of a vehicle, said inflatable restraint having an uninflated condition and an inflated condition;
   a housing having a chamber for receiving said inflatable restraint when said inflatable restraint is in the uninflated condition;
   said housing having first and second walls spaced apart from each other and a curved central wall interconnecting said first and second walls;
   said housing having a first plurality of openings extending through said first wall between the interior and the exterior of said housing, said first plurality of openings being spaced apart from each other along said first wall;
   said housing having a second plurality of openings extending through said second wall between the interior and the exterior of said housing, said second plurality of openings being spaced apart from each other along said second wall, said second plurality of openings being aligned with said first plurality of openings;
   tether means connected with said inflatable restraint for securing said air bag to said housing, said tether means comprising a plurality of tethers extending from said inflatable restraint through said openings in said housing from the interior to the exterior of said housing;
   said plurality of tethers including a first group of tethers extending from said inflatable restraint through said first plurality of openings in said housing first wall from the interior to the exterior of said housing, and a second group of tethers extending from said inflatable restraint through said second plurality of openings in said housing second wall from the interior to the exterior of said housing;
   said tethers comprising elongate straps having inner end portions disposed within the interior of said housing and outer end portions disposed on the exterior of said housing, said openings comprising slots in said housing walls; and
   said apparatus further comprising means for connecting said tethers to the exterior of said housing, said means for connecting including a plurality of mounting studs disposed on the exterior of said housing and equal in number to the number of tethers in said first group of tethers.

4. An apparatus as set forth in claim 3 wherein said mounting studs comprise externally threaded members projecting from said housing in a direction away from said chamber, said tethers having outer end portions in which openings are formed, said mounting studs extending through said openings in said tether outer end portions, said means for connecting further including nuts disposed on said mounting studs and cooperating with said mounting studs to clamp said tether outer end portions against said housing thereby to secure said tethers to said housing.

5. An apparatus comprising:
   an inflatable vehicle occupant restraint for, when inflated, restraining an occupant of a vehicle, said inflatable restraint having an uninflated condition and an inflated condition;
   an inflator for, when actuated, inflating said inflatable restraint;
   a housing defining a chamber for receiving said inflator and said inflatable restraint when said inflatable restraint is in the uninflated condition, said housing having a plurality of openings extending between the interior and the exterior of said housing;
   said housing having a first end portion defining a deployment opening through which said inflatable restraint inflates and a second end portion including an end wall opposite from said deployment opening;
   said inflator being disposed in said chamber at a location adjacent to said end wall and intermediate said inflatable restraint and said end wall;
   a plurality of tethers connected with said inflatable restraint, said tethers extending from said inflatable restraint through said openings in said housing from the interior to the exterior of said housing; and
   means for connecting said tethers to the exterior of said housing to secure said tethers to said housing and thereby to secure said inflatable restraint to said housing;

said means for connecting said tethers to the exterior of said housing comprising means for connecting said tethers to said end wall of said housing, said end wall being disposed intermediate said inflator and said tethers.

6. An apparatus as set forth in claim 5 wherein said housing includes a generally planar upper wall, a generally planar lower wall spaced from and extending parallel to said upper wall, and a curved central wall extending between and interconnecting said upper wall and said lower wall to form a C-shaped cross-sectional configuration, said central wall forming said end wall of said housing.

7. An apparatus as set forth in claim 6 wherein said means for connecting said tethers to the exterior of said housing comprises means for connecting a first end portion of a first one of said tethers to a first end portion of a second one of said tethers at a first mounting location on an outer major side surface of said end wall of said housing, said inflator being disposed intermediate said first mounting location and said deployment opening.

8. An apparatus as set forth in claim 7 wherein said first and second tethers extend for approximately 180° around said curved central wall of said housing and overlie said outer major side surface of said curved central wall of said housing.

9. An apparatus as set forth in claim 5 wherein said means for connecting said tethers to the exterior of said housing comprises a threaded member disposed on the exterior of said housing.

10. An apparatus as set forth in claim 5 wherein said plurality of tethers includes a first group of tethers extending from said inflatable restraint through a first plurality of said openings in said housing and a second group of tethers extending from said inflatable restraint through a second plurality of said openings in said housing;

said tethers comprising elongate straps having inner end portions disposed within the interior of said housing and outer end portions disposed on the exterior of said housing, said openings comprising slots in said housing;

said means for connecting including a plurality of mounting studs disposed on the exterior of said housing and equal in number to the number of tethers in said first group of tethers.

11. An apparatus as set forth in claim 10 wherein said mounting studs comprise externally threaded members projecting from said housing in a direction away from said chamber, said tethers having outer end portions in which openings are formed, said mounting studs extending through said openings in said tether outer end portions, said means for connecting further including nuts disposed on said mounting studs and cooperating with said mounting studs to clamp said tether outer end portions against said housing thereby to secure said tethers to said housing.

12. An apparatus as set forth in claim 5 wherein said inflator has a longitudinal axis, said openings comprising elongate slots extending in a direction parallel to said axis of said inflator.

13. An apparatus as set forth in claim 5 wherein said openings are formed in side walls of said housing and are spaced apart from said end wall and wherein each of said tethers has an inner end portion disposed in said chamber and connected with said inflatable restraint at a location adjacent to an opening in said housing side wall through which said tether extends.

14. An apparatus as set forth in claim 5 having no retaining ring securing said inflatable restraint to said housing.

* * * * *